United States Patent
Browne

(10) Patent No.: US 10,195,915 B2
(45) Date of Patent: Feb. 5, 2019

(54) MIDDLE HOOP SYSTEM FOR AN ARTICULATED VEHICLE

(71) Applicant: ATG Autotechnik GmbH, Siek (DE)

(72) Inventor: Denis Browne, Trittau (DE)

(73) Assignee: ATG Autotechnik GmbH, Siek (DE)

(*) Notice: Subject to any disclaimer, the term of this patent is extended or adjusted under 35 U.S.C. 154(b) by 0 days.

(21) Appl. No.: 15/426,731

(22) Filed: Feb. 7, 2017

(65) Prior Publication Data
US 2017/0240012 A1     Aug. 24, 2017

(30) Foreign Application Priority Data

Feb. 18, 2016  (EP) .................................. 16156369

(51) Int. Cl.
| | | |
|---|---|---|
| B60D 1/64 | (2006.01) | |
| B60D 5/00 | (2006.01) | |
| B61D 17/22 | (2006.01) | |
| B62D 47/02 | (2006.01) | |

(52) U.S. Cl.
CPC ................. B60D 1/64 (2013.01); B60D 5/00 (2013.01); B60D 5/003 (2013.01); B60D 5/006 (2013.01); B61D 17/22 (2013.01); B62D 47/025 (2013.01)

(58) Field of Classification Search
CPC . B60D 1/64; B60D 1/62; B60D 5/003; B60D 5/006; B62D 47/025
See application file for complete search history.

(56) References Cited

U.S. PATENT DOCUMENTS

| | | | | |
|---|---|---|---|---|
| 6,076,470 A | * | 6/2000 | Koch ..................... | B60D 5/006 105/14 |
| 8,366,132 B2 | * | 2/2013 | Browne ................. | B61D 17/22 105/8.1 |
| 8,523,215 B2 | * | 9/2013 | Browne ................... | B60D 1/62 105/8.1 |

FOREIGN PATENT DOCUMENTS

| | | |
|---|---|---|
| EP | 0 897 337 | 2/2000 |
| EP | 2 384 913 | 9/2011 |

OTHER PUBLICATIONS

European Search Report.

* cited by examiner

*Primary Examiner* — Kevin Hurley
*Assistant Examiner* — Michael R Stabley
(74) *Attorney, Agent, or Firm* — Alix, Yale & Ristas, LLP

(57) ABSTRACT

A middle hoop system for a vehicle joint arranged between a vehicle front part and a vehicle rear part of a vehicle and forms a passage between the vehicle front part and the vehicle rear part. The middle hoop surrounds the passage. The middle hoop system comprises a cable strand which extends between the vehicle front part and the vehicle rear part, wherein the cable strand is arranged above the passage. The middle hoop system comprises a pivot lever between the middle hoop and the cable strand. A first pivot joint is formed between the pivot lever and the middle hoop. In a preferred embodiment, the pivot lever guides the cable strand at a distance from the first pivot joint. The middle hoop system is cost-effective and provides reliable guidance for the cable strand.

20 Claims, 4 Drawing Sheets

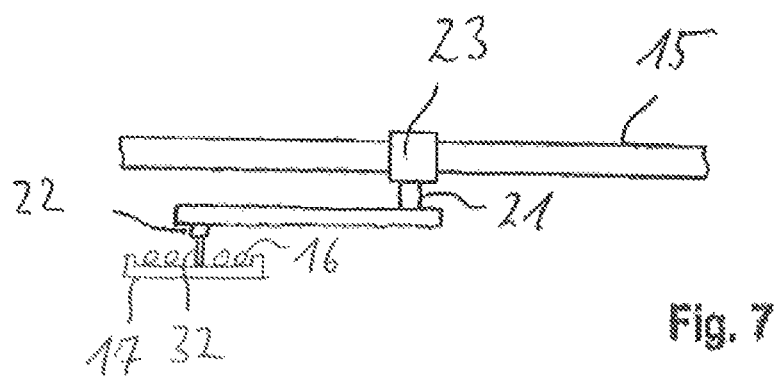

MIDDLE HOOP SYSTEM FOR AN ARTICULATED VEHICLE

BACKGROUND

The invention relates to a middle hoop system for an articulated vehicle. The articulated vehicle comprises a vehicle front part and a vehicle rear part which are connected to each other by a vehicle joint. There is a passage between the vehicle front part and the vehicle rear part, which passage is surrounded by the middle hoop. The middle hoop system comprises a cable strand between the vehicle front part and the vehicle rear part. The cable strand is arranged above the passage.

Middle hoop systems of this type are used, for example, in articulated buses, in which it is possible for the passengers to pass between the vehicle front part and the vehicle rear part while the vehicle is travelling. To protect the passengers from environmental influences, a bellows is typically provided between the vehicle front part and the vehicle rear part, which bellows surrounds the vehicle joint.

In said articulated vehicles, there are technical functions which relate both to the vehicle front part and to the vehicle rear part. For example, if the driver, who is seated in the vehicle front part, actuates the light switch, this should result in a rear lighting system of the vehicle rear part being illuminated. In order to enable this, an electrical cable extends from the vehicle front part via the intermediate space as far as the vehicle rear part. Further functions require hydraulic lines, air hoses and other supply lines between the vehicle front part and the vehicle rear part.

In low-floor vehicles, in which the floor intended for the passengers is arranged as low as possible, only a small amount of space remains below the passage which connects the vehicle front part and the vehicle rear part. There is more space available above the passage, and therefore the cables are frequently guided there.

In order to prevent the cable strand from striking against the middle hoop when the vehicle travels over bumps or in the event of unevenness, the cable strand has to be guided relative to the middle hoop. The known systems (EP 0 897 337 A1, EP 2 384 913 A1) are complex and complicated to produce.

SUMMARY

Briefly stated, a cost-effective middle hoop system is presented, in which the cable strand is guided in such a manner that it does not strike against the middle hoop.

The middle hoop system is configured in such a manner that a pivot lever extends between the middle hoop and the cable strand. A first pivot joint is formed between the pivot lever and the middle hoop. In a preferred embodiment, the pivot lever guides the cable strand at a distance from the first pivot joint. Distance to the first pivot joint means that the direction of the axis of the first pivot joint does not intersect with the cable strand. The cable strand has a radial distance from the axis of the first pivot joint.

Some terms will be explained first. Within the context of the present invention, cables serve to link technical functions of the vehicle front part and of the vehicle rear part to one another. The term "cable" encompasses all supply lines via which signals or forces are transmitted between the vehicle front part and the vehicle rear part. The term "cable" encompasses, in particular, electrical cables, glass fibre lines, hydraulic lines, air hoses for an air-conditioning system and heating system. In the middle hoop system, a plurality of cables of this type extend between the vehicle front part and the vehicle rear part. The cable strand comprises all cables which are guided with the pivot lever. The longitudinal direction of the vehicle encloses a right angle with the middle hoop.

The movements taking place between the vehicle front part and the vehicle rear part during operation of the articulated vehicle are complex. Said movements include rotation, pitching, rolling and combinations thereof. The movements which are executed here by the cable strand and the middle hoop in the intermediate space between the vehicle front part and the vehicle rear part are not always synchronous. By means of the pivot lever, firstly the required freedom of movement between the cable strand and the middle hoop is permitted while, secondly, those movements which are undesirable are suppressed. Especially undesirable are those movements of the cable strand that cause the cable strand to strike against the middle hoop.

By contrast, it is desirable for there to be freedom of movement between the cable strand and the middle hoop with respect to longitudinal movement. By the cable strand being guided by the pivot lever at a distance from the first pivot joint, the middle hoop can move in the longitudinal direction without the cable strand likewise being forced into a corresponding movement. For this purpose, it is advantageous in particular if, as seen from the first pivot joint, there is only one direction of the pivot lever in which the cable strand is connected to the pivot lever. A pivot lever which is connected to the cable strand on two sides of the first pivot joint regularly brings about undesirable forced guidance in the longitudinal direction. This applies in particular if the cable strand extends parallel to the pivot lever and is therefore not guided at a distance from the first pivot joint.

The pivot lever is preferably configured in such a manner that it provides defined vertical guidance for the cable strand. Defined vertical guidance means that neither a force directed from the top downwards nor a force directed from the bottom upwards can bring about a movement in the vertical direction. The defined vertical guidance is preferably independent of the angular position of the pivot lever.

The pivot lever preferably extends between a suspension on a middle hoop and a suspension on a carrying element of the cable strand. The suspension on the middle hoop and the suspension on the carrying element of the cable strand are preferably at a distance from each other in the horizontal direction. As a result, the vertical forces can be transmitted between the cable strand and the middle hoop.

A first pivot joint can be provided between the pivot lever and the middle hoop, via which pivot joint the pivot lever can be pivoted relative to the middle hoop. The first pivot joint can be arranged close to a first end of the pivot lever. The axis of the first pivot joint can be oriented substantially vertically or preferably precisely vertically.

A second pivot joint can be provided between the pivot lever and the cable strand, via which pivot joint the pivot lever can be pivoted relative to the carrying element of the cable strand. The second pivot joint can be arranged close to a second end of the pivot lever. The axis of the second pivot joint can be oriented substantially vertically or preferably precisely vertically.

In the normal state in which the articulated vehicle is directly standing on a flat surface, the pivot lever is preferably oriented horizontally. The angle which the pivot lever encloses with the transverse direction is preferably smaller than 45°, furthermore preferably smaller than 30°, furthermore preferably smaller than 10°. The pivoting range for which the pivot lever is oriented during the operation of the articulated vehicle preferably encloses the transverse direction.

The angle at which the pivot lever intersects the cable strand is preferably greater than 45°, furthermore preferably greater than 60°, furthermore preferably greater than 80°, in the normal state of the articulated vehicle. In a preferred embodiment, the angle at which the cable strand intersects the middle hoop in the normal state of the articulated vehicle is greater than 45°, preferably greater than 60°, furthermore preferably greater than 90°.

If the pivot lever has a fixed length and is connected to the middle hoop and to the carrying element of the cable via pivot joints arranged in a fixed position, forced guidance arises in the horizontal direction because the movement which that end of the pivot lever which is connected to the cable strand executes does not always correspond to the longitudinal direction of the cable strand in this section. In order to avoid such forced guidance, a sliding guide can be provided between the pivot lever and the middle hoop and/or between the pivot lever and the cable strand. The sliding guide can be oriented in the transverse direction or can comprise at least one directional component in the transverse direction. The sliding guide is preferably arranged between the middle hoop and the pivot joint of the pivot lever. In addition or alternatively to the sliding guide, the pivot lever can have a variable length which changes during the operation of the articulated vehicle because of the movements between the vehicle front part and the vehicle rear part.

In order to be able to absorb movements between the vehicle front part and the vehicle rear part, the cable strand generally takes a curved path in the intermediate space between the vehicle front part and the vehicle rear part. In order not to unnecessarily restrict the ceiling height in the passage, the curved path should extend substantially in a horizontal plane. In an advantageous embodiment, a cable guide is provided, on which the cable strand path in the intermediate space between the vehicle front part and the vehicle rear part can be oriented. The cable guide preferably has a fixed length. The cable guide can comprise, for example, a leaf spring which is fastened to the vehicle front part and to the vehicle rear part and, in the intermediate space, takes substantially the same path as the cable strand. A leaf spring refers to an elongate element which can easily be elastically deformed in a direction transversely with respect to the longitudinal direction thereof and can be elastically deformed with more difficulty in another direction. It is also possible for the cable guide to comprise rigid strut rods which are suspended in a suitable manner on joints such that said strut rods can absorb movements between the vehicle front part and the vehicle rear part.

In some articulated vehicles, the middle hoop is guided in such a manner that it always takes up a central position between the vehicle front part and the vehicle rear part. With a middle hoop of this type, the mounting for the cable strand can be readily used. Use is also possible with middle hoops which, during operation of the articulated vehicle, are not fixed to a central position between the vehicle front part and the vehicle rear part. For example, the middle hoop can be held by means of a strut rod at a fixed distance from the vehicle front part or the vehicle rear part. The strut rod can be coupled to the middle hoop and can permit rotation of the middle hoop about a vertical axis. If the middle hoop is held at a fixed distance from one of the vehicle parts by a strut rod of this type, pitching movements are compensated for by a relative movement between the middle hoop and the other vehicle part.

Instead of a completely rigid link, a connection may also be provided which is rigid in relation to compressive forces, but can be extended under tensile forces. If the articulated vehicle travels over a bump and the distance between the vehicle front part and the vehicle rear part therefore increases in the upper region, the middle hoop can move further away from the vehicle part with which there is the connection and, as a result, can contribute to spanning the distance. The distance between the middle hoop and the vehicle front part or vehicle rear part, which distance is defined by the strut rod in the normal state, is then at the same time the minimum distance. By contrast, the distance can be increased by tensile force.

BRIEF DESCRIPTION OF THE DRAWINGS

The invention is described below using advantageous embodiments and with reference to the attached drawings, in which:

FIG. 7 shows a view of an additional embodiment of a carrying element suspended on a leaf spring.

DETAILED DESCRIPTION

Figure 1:
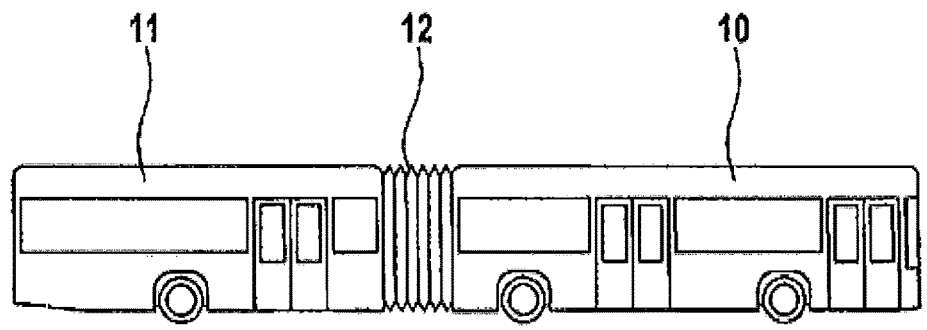
FIG. 1 shows a side view of an articulated vehicle.

An articulated bus which is shown in FIG. 1 comprises a vehicle front part 10 and a vehicle rear part 11. The vehicle front part 10 and the vehicle rear part 11 are connected to each other via a vehicle joint (not illustrated in FIG. 1) in such a manner that passengers can change between the vehicle front part 10 and the vehicle rear part 11 through a passage 33 while the vehicle is travelling. A bellows 12 surrounds the vehicle joint and the passage 33. The middle hoop system is arranged in the intermediate space between the vehicle front part 10 and the vehicle rear part 11 and is concealed in FIG. 1 by the bellows 12.

Figure 2:
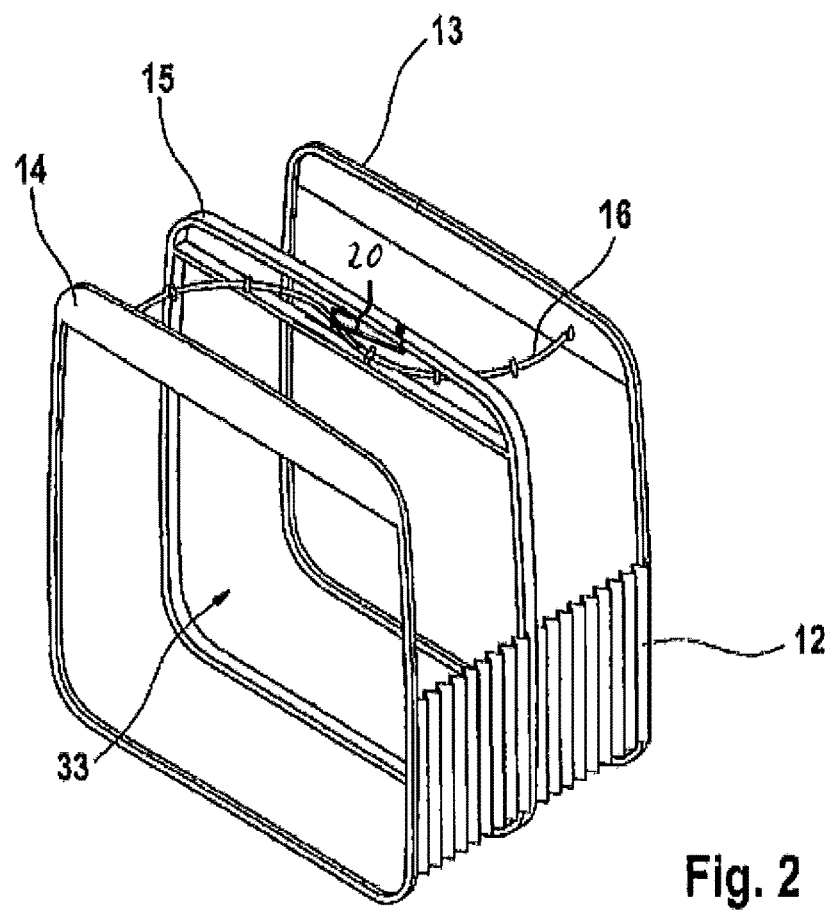
FIG. 2 shows a perspective view of a middle hoop system.

FIG. 2 shows the end frame 13 of the vehicle front part 10 and the end frame 14 of the vehicle rear part 11. Only sections of the bellows 12 are shown in FIG. 2. A middle hoop 15 providing the bellows 12 with additional support is arranged between the end frame 13 and the end frame 14. A cable strand 16 extends from the end frame 13 to the end frame 14. The cable strand 16 takes a curved path, which extends substantially in a horizontal plane, in the intermediate space between the vehicle front part 10 and the vehicle rear part 11. As a result, the cable strand 16 is capable of compensating for movements executed by the vehicle front part 10 and the vehicle rear part 11 relative to each other.

The cable strand 16 is suspended on the middle hoop 15 via a pivot lever 20. The pivot lever 20 is pivotable about a vertical axis both relative to the middle hoop 15 and relative to the cable strand 16. The cable strand 16 is therefore ensured freedom of movement in the longitudinal direction relative to the middle hoop 15, by means of which relative movements between the vehicle front part 10 and the vehicle rear part 11 can be compensated for. The cable strand 16 and the middle hoop 15 can take up the position, in which they are subject to the smallest possible load, independently of each other.

Figure 3:
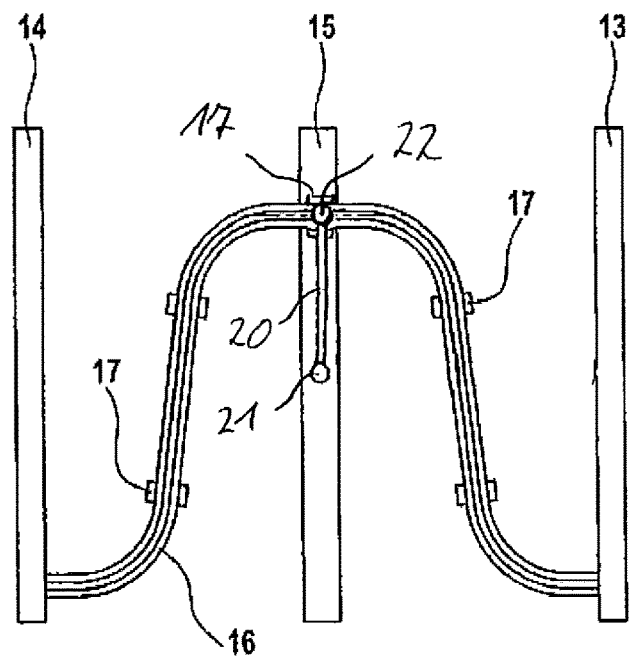
FIG. 3 shows a schematic view from above of a middle hoop system.

In the embodiment of FIG. 3, the cable strand 16 extends between the end frame 13 and the end frame 14. The cables of the cable strand 16 are held parallel to each other in a horizontal plane by means of carrying elements 17 such that said cables extend in the form of a uniform strand through the intermediate space between the end frame 13 and the end frame 14.

The cable strand 16 is mounted relative to the middle hoop 15 via the pivot lever 20 which is connected to the middle hoop 15 via a first pivot joint 21 and which is connected to one of the carrying elements 17 of the cable strand 16 via a second pivot joint 22. The pivot lever 20 causes the cable strand 16 to be subjected to defined vertical guidance, and therefore the cable strand 16 cannot strike upwards or downwards when the vehicle travels over bumps or in the event of unevenness. In the horizontal plane, the cable strand 16 has substantial freedom of movement relative to the middle hoop 15. A certain forced guidance arises only because of the fixed length of the pivot lever 20.

Figure 4:
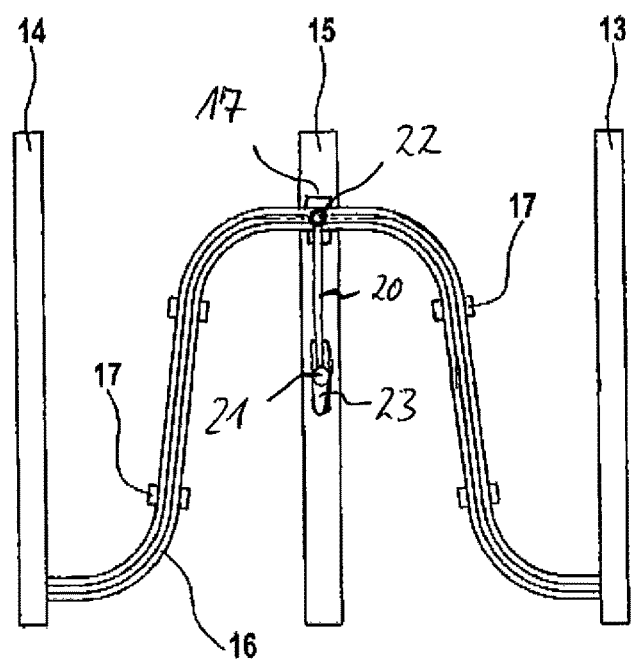
FIG. 4 shows the view from FIG. 3 for a further embodiment.

FIG. 4 shows an embodiment in which a sliding guide 23 which is oriented in the transverse direction is additionally provided between the pivot lever 20 and the middle hoop 15. The coupling point of the pivot joint 21 can move relative to the middle hoop 15 via the sliding guide 23. As a result, the forced guidance provided in FIG. 3 because of the length of the pivot lever 20 is eliminated. With respect to the horizontal plane, cable strand 16 and the middle hoop 15 can move freely relative to each other, and therefore both can take up the position in which the least stresses occur. By contrast, in the vertical direction, the cable strand 16 continues to be subject to the desired defined guidance, and therefore striking of the cable strand upwards or downwards is prevented.

Figure 5:
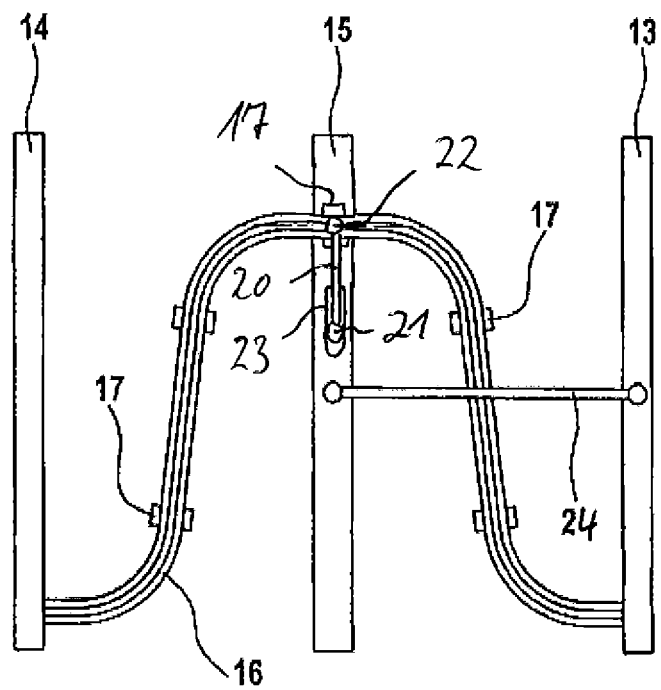
FIG. 5 shows the view from FIG. 3 for yet another embodiment.
Figure 6:
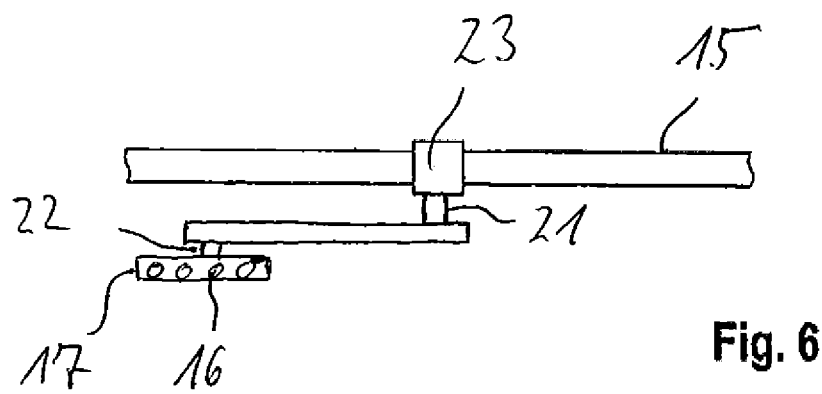
FIG. 6 shows a view in the longitudinal direction of part of a middle hoop system.

In the embodiment according to FIG. 5, the middle hoop 15 is connected to the end frame 13 via a rigid strut rod 24. The strut rod 24 is connected both to the end frame 13 and to the middle hoop 15 via a joint which permits pivoting movements about a vertical axis of articulation. Therefore, if the articulated bus travels around a corner and buckles in the lateral direction, the middle hoop 15 can complete the corresponding pivoting movement such that it permanently takes up approximately a central position between the end frame 13 and the end frame 14. By contrast, if the articulated bus travels over a bump, the corresponding pitching movement is compensated for only between the middle hoop 15 and the end frame 14. The distance between the end frame 13 and the middle hoop 15 remains constant owing to the strut rod 24. During pitching movements, the middle hoop 15 is therefore not in a central position between the end frame 13 and the end frame 14. In particular in this embodiment, it is advantageous if a sliding guide 23 is provided between the pivot lever 20 and the middle hoop 15 because the relative movements between the middle hoop 15 and the cables 16 are greater than in an embodiment in which the middle hoop 15 is held permanently in a central position between the end frame 13 and the end frame 14.

In the embodiments described previously, the cables are held together by carrying elements 17 to form a cable strand 16. Moreover, no further measures are provided for stabilizing the cable strand 16. The path taken by the cable strand 16 in the intermediate space between the vehicle front part 10 and the vehicle rear part 11 is determined solely from the inherent stability of the cable strand 16.

In other embodiments as illustrated in FIG. 7, an additional cable guide can be provided, for example in the form of a leaf spring 32. FIG. 7 shows the carrying element 17 suspended on a leaf spring 32 extending parallel to the cable strands 16.

The invention claimed is:

1. Middle hoop system for a vehicle joint which is arranged between a vehicle front part and a vehicle rear part of a vehicle and forms a passage between the vehicle front part and the vehicle rear part and a middle hoop, comprising a cable strand extending between the vehicle front part and the vehicle rear part, wherein the middle hoop surrounds the passage, and wherein the cable strand is arranged above the passage, characterized by a pivot lever between the middle hoop and the cable strand, wherein a first pivot joint at an end portion of the pivot lever is formed between the pivot lever and the middle hoop, the pivot lever rotates about an axis centered on the first pivot joint, and the pivot lever guides the cable strand at a radial distance from the axis of the first pivot joint.

2. Middle hoop system according to claim 1, characterized in that the pivot lever provides defined vertical guidance for the cable strand.

3. Middle hoop system according to claim 2, characterized in that the pivot lever intersects the cable strand at an angle of at least 45°.

4. Middle hoop system according to claim 2, characterized in that a second pivot joint is arranged between the pivot lever and the cable strand.

5. Middle hoop system according to claim 2, characterized in that the pivoting range of the pivot lever comprises the transverse direction.

6. Middle hoop system according to claim 1, characterized in that the pivot lever intersects the cable strand at an angle of at least 45°.

7. Middle hoop system according to claim 6, characterized in that the pivot lever intersects the cable strand at an angle of at least 60°.

8. Middle hoop system according to claim 6, characterized in that the pivot lever intersects the cable strand at an angle of at least 80°.

9. Middle hoop system according to claim 6, characterized in that a second pivot joint is arranged between the pivot lever and the cable strand.

10. Middle hoop system according to claim 1, characterized in that a second pivot joint is arranged between the pivot lever and the cable strand.

11. Middle hoop system according to claim 1, characterized in that the pivoting range of the pivot lever comprises the transverse direction.

12. Middle hoop system according to claim 1, characterized by a sliding guide between the pivot lever and the middle hoop and/or between the pivot lever and the cable strand.

13. Middle hoop system according to claim 12, characterized in that the sliding guide is oriented in the transverse direction.

14. Middle hoop system according to claim 1, characterized in that the pivot lever is variable in length.

15. Middle hoop system according to claim 1, characterized in that a cable guide which extends between the vehicle front part and the vehicle rear part is provided, to which the cable strand is fastened.

16. Middle hoop system according to claim 15, characterized in that the cable guide defines a path of fixed length between the vehicle front part and the vehicle rear part.

17. Middle hoop system according to claim 16, characterized in that the cable guide comprises a leaf spring.

18. Middle hoop system according to claim 1, characterized in that a strut rod is provided, said strut rod being coupled to the middle hoop and permitting rotation of the middle hoop about a vertical axis, the strut rod producing a connection to the vehicle front part or to the vehicle rear part.

19. Middle hoop system for a vehicle joint which is arranged between a vehicle front part and a vehicle rear part of a vehicle and forms a passage between the vehicle front part and the vehicle rear part and a middle hoop, comprising a cable strand extending between the vehicle front part and the vehicle rear part, wherein the middle hoop surrounds the passage, and wherein the cable strand is arranged above the passage, characterized by a pivot lever between the middle hoop and the cable strand, wherein a first pivot joint is formed between the pivot lever and the middle hoop, the pivot lever rotates about an axis centered on the first pivot joint, and extends radially from said axis and the pivot lever intersects and guides the cable strand at only one radial location from the axis of the first pivot joint.

20. Middle hoop system for a vehicle joint which is arranged between a vehicle front part and a vehicle rear part of a vehicle and forms a passage between the vehicle front part and the vehicle rear part and a middle hoop, comprising a cable strand extending between the vehicle front part and the vehicle rear part, wherein the middle hoop surrounds the passage, and wherein the cable strand is arranged above the passage, characterized by a pivot lever between the middle hoop and the cable strand, wherein a first pivot joint is formed between the pivot lever and the middle hoop, the pivot lever rotates about an axis centered on the first pivot joint, and the pivot lever pivotally connects and guides the cable strand at only one position along the cable strand at a radial distance from the axis of the first pivot joint.

\* \* \* \* \*